(Model.) 2 Sheets—Sheet 1.

L. EBERHART.
CHECK-ROWER FOR CORN PLANTERS.

No. 268,085. Patented Nov. 28, 1882.

Witnesses.
Thos. H. Hutchins.
Wm. J. Hutchins.

Inventor.
Lloyd Eberhart.

(Model.) 2 Sheets—Sheet 2.

L. EBERHART.
CHECK ROWER FOR CORN PLANTERS.

No. 268,085. Patented Nov. 28, 1882.

Witnesses.
Thos. H. Hutchins
Wm. J. Hutchins

Inventor.
Lloyd Eberhart.

N. PETERS, Photo-Lithographer, Washington, D. C.

United States Patent Office.

LLOYD EBERHART, OF JOLIET, ILLINOIS.

CHECK-ROWER FOR CORN-PLANTERS.

SPECIFICATION forming part of Letters Patent No. 268,085, dated November 28, 1882.

Application filed July 15, 1882. (Model.)

*To all whom it may concern:*

Be it known that I, LLOYD EBERHART, of the city of Joliet, in Will county, and State of Illinois, have invented certain new and useful Improvements in Check-Rowers for Seed-Planters, the construction and operation of which I will proceed to explain, reference being had to the annexed drawings and the letters and figures thereon, in which—

Figure 1:
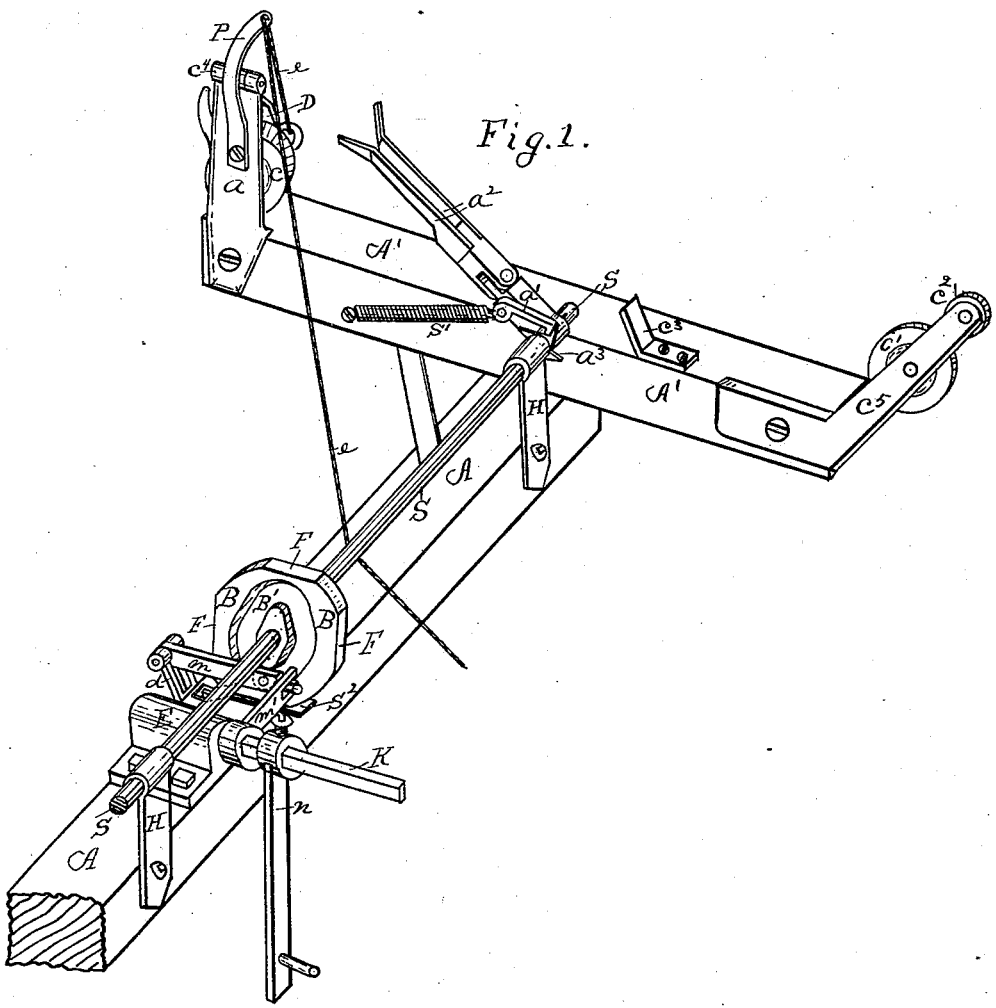
Figure 2:
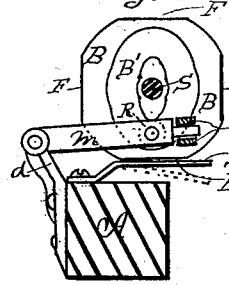
Figure 3:
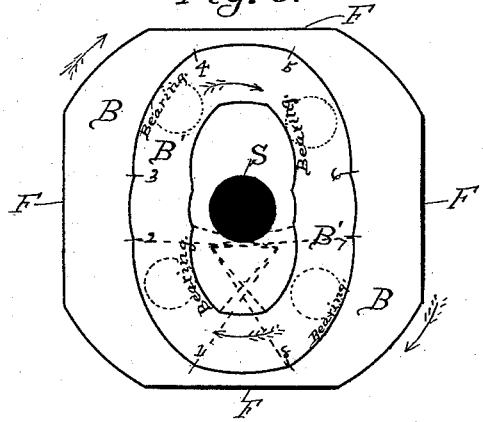
Figure 4:
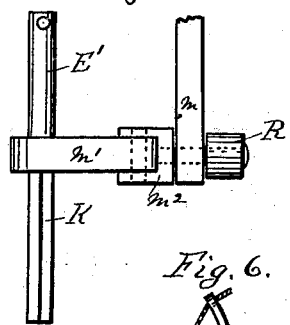
Figure 5:
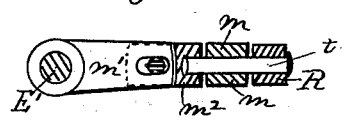
Figure 6:
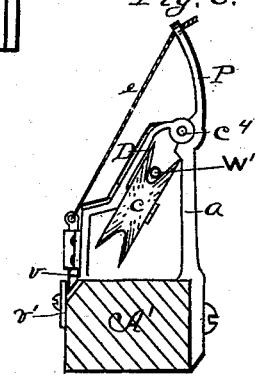

Figure 1 is a perspective view; Fig. 2, a cross-sectional view in front of the cam B on the line 1, Fig. 1; Fig. 3, a front elevation of the cam B to show the shape of its face-groove B'; Fig. 4, a plan view on the top of the arm $m'$; Fig. 5, a side view of the same; Fig. 6, an end view of the head A', showing the dump-sheave $c$; and Fig. 7, a side view of the arm $m'$, having a friction-roller on its outer end to operate in the face-groove of the cam B.

This invention relates to that class of check-rowers which are intended to be attached to any of the ordinary corn or seed planters and to be operated by a cord or wire having knots at intervals along its entire length and stretched across the field. In the view, Fig. 1, only one end or head is shown, as the heads at either end are alike.

The main beam A, cross-head A', shaft S, and the forked lever with its attachments are the same as those in common use.

The principal new features in this invention are in the use of the cam B having the peculiarly-shaped face-groove B' and the mechanism operated by said cam, and in the arrangement for dumping the wire that operates the machine from the machine to free it therefrom, so it may be turned about and the knotted wire or cord be placed in the opposite head for the machine to return.

In Fig. 1, $d$ is a standard attached to the beam A at its foot. To its upper end is hinged the outer end of the lever $m$. The lever $m$ is provided near its inner end, on the side next the cam-wheel B, with a wrist, upon which is a friction-roller, R, which travels in the face-groove B' of the cam B as it rotates. The inner end of the lever $m$ is inclosed by the forked end of the crank $m'$ on the shaft $k$, so that when the cam rotates it will, by means of the friction-roller R, traveling in the groove B', which is nearly elliptical in form, give an oscillating motion up and down to the crank $m'$ and a corresponding motion to the shaft $k$, for the purpose of giving a swinging motion to the crank $n$ on the shaft $k$ to move the seed-slide, that may be attached to its lower end, and not necessary to be shown. The groove B' in the face of the cam B is irregular in shape, so that while the cam may rotate continuously the lever $m$ will remain stationary an instant, both at the extremity of its upward and downward stroke. The precise form of the channel B' is shown in Fig. 3. The curvature of the channel B' between the figures 1 8, 2 3, 6 7, and 4 5 is on a radius with a line from the center of the cam B, while the curvature of said channel between the figures 1 and 2, 3 and 4, 5 and 6, 7 and 8, is on a radius with the points formed by a juncture of the dotted lines $n$. As the cam rotates in the direction of the arrow the sides of the channel B' marked "Bearing" will bear against the friction-roller R and move it up or down, as the case may be. By this form of the channel B' a very quick motion is given up and down to the lever $m$, so the seed-slide below will receive a quick positive motion. The periphery of the cam B has its four sides opposite the four extremities of the channel-groove B' flattened at F. As the cam rotates its periphery impinges with the flat spring $S^2$, immediately below it, as shown in Fig. 2, for the purpose of causing the cam to stop and stand still an instant at those places until the next knot on the cord or wire comes in contact with the forked lever $a^2$. Each rotation of the cam moves the arm $m$ up and down twice.

Figure 7:
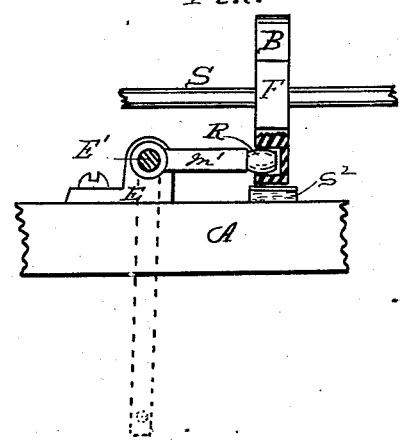

The crank $m'$ may have the friction-roller R attached directly to its outer end and traverse the channel-groove B' of the cam, and dispense with the use of the lever $m$, as shown in Fig. 7. Also, the crank $m'$ may be connected with the arm $m$ by the joint, as shown in Figs. 4 and 5, or in any suitable manner for the purpose. The object of the use of the arm $m$ is that as it oscillates up and down at its outer end by means of the friction-roller R in the channel-groove B' the friction-roller will remain in a horizontal position all the time in the said channel, by which means the roller R, while in operation, will lie in a horizontal position in the groove B' of the cam.

The device for disengaging the knotted cord or wire from the machine is shown in Figs. 1 and 6. The knotted cord or wire is designed to pass between the grooved sheaves $c'$ and $c^2$, Fig. 1, and over the grooved sheave $c$. The sheave $c$ is journaled to the under side of the frame D, the upper end of which is hinged to the upright standard $a$, attached to the cross-head A, as shown in Fig. 6. A cord, $e$, runs from the outer lower end of the frame D, through an eye in the upper end of the standard P, to the operator on the machine, as shown in Fig. 1. A catch, $v$, serves to hold the hinged frame D down when the machine is in operation. When it is desired to disengage or dump the knotted wire or cord $w'$ from the sheave $c$, a pull on the cord $e$ will raise the lower end of the frame D, with the sheave $c$, up and outward and permit the knotted wire or cord $w'$ to fall out of the said sheave and off the machine, as it will immediately run out from between the sheaves $c'$ and $c^2$ as soon as it is dumped from the sheave $c$, thus forming a very simple and cheap device for the purpose.

The cam B may be provided with a flange of suitable shape, instead of the groove B', so that it may rotate between two friction-rollers to produce the same result.

Having thus described my invention, what I claim as new, and desire to secure by Letters Patent, is as follows, to wit:

1. In a check-rower attachment for seed-planters, the cam-wheel B, attached to the shaft S, as shown, and provided with the face cam channel B', four sections of said channel being curved on a radius from the center of the cam and connected by four intermediate eccentric sections, as shown, to impart a quick motion to the lever $m$ and permit said lever to remain stationary at intervals, as set forth.

2. In a check-rower for seed-planters, the combination of the cam-wheel B, having the face-channel B', constructed as shown, and flattened periphery F, shaft $s$, flat spring $s^2$, lever $m$, friction-roller R, crank $m'$, shaft $k$, and frame A, all arranged to operate in the manner and for the purpose set forth.

3. In a check-rower attachment for seed-planters, the standard P, supported on the cross-head A' on its inner side, and forming a guard to hold the wire $w'$ in the sheave $c$, and hinged at its upper end to the swinging arm D, having the sheave $c$, which carries the cord or wire $w'$, journaled to its lower side, and arranged, as shown, to permit the sheave $c$ to be inverted by means of the cord $e$ to drop the wire $w'$, as and for the purpose set forth.

LLOYD EBERHART.

Witnesses:
WM. J. HUTCHINS,
THOS. H. HUTCHINS.